United States Patent [19]

Maebashi

[11] Patent Number: 5,081,975
[45] Date of Patent: Jan. 21, 1992

[54] IDLE STABILIZING SYSTEM FOR ENGINE

[75] Inventor: Kosei Maebashi, Iwata, Japan

[73] Assignee: Yamaha Hatsudoki Kabushiki Kaisha, Iwata, Japan

[21] Appl. No.: 633,083

[22] Filed: Dec. 21, 1990

[30] Foreign Application Priority Data

Dec. 27, 1989 [JP] Japan .................................. 1-343767
Jun. 12, 1990 [JP] Japan .................................. 2-153124

[51] Int. Cl.⁵ ...................... F02M 51/00; F02M 41/12
[52] U.S. Cl. .................................... 123/493; 123/339
[58] Field of Search ............... 123/493, 339, 325, 326, 123/371, 500, 501

[56] References Cited

U.S. PATENT DOCUMENTS

| | | | |
|---|---|---|---|
| 4,386,591 | 6/1983 | Nagase et al. ........................ | 123/339 |
| 4,430,973 | 2/1984 | Miyagi ................................. | 123/339 |
| 4,437,442 | 3/1984 | Yamaguchi ........................... | 123/325 |
| 4,491,115 | 1/1985 | Otobe et al. .......................... | 123/325 |
| 4,503,822 | 3/1985 | Kobayashi et al. .................. | 123/493 |
| 4,506,641 | 3/1985 | Hasegawa ............................ | 123/339 |
| 4,550,703 | 11/1985 | Ootuka et al. ........................ | 123/325 |
| 4,558,672 | 12/1985 | Boccadoro et al, ................. | 123/493 |
| 4,565,174 | 1/1986 | Suzuki et al. ........................ | 123/493 |
| 4,572,125 | 2/1986 | Kratt .................................... | 123/325 |
| 4,598,679 | 7/1986 | Ohkumo et al. ..................... | 123/325 |
| 4,730,587 | 3/1988 | Norota et al. ........................ | 123/493 |
| 4,784,103 | 11/1988 | Ohishi ................................. | 123/493 |
| 4,923,042 | 5/1990 | Yamabe et al. ...................... | 123/325 |

FOREIGN PATENT DOCUMENTS 2043772 10/1980 United Kingdom ................ 123/371

Primary Examiner—E. Rollins Cross
Assistant Examiner—Thomas N. Moulis
Attorney, Agent, or Firm—Ernest A. Beutler

[57] ABSTRACT

A fuel injection system for an engine and method of operating it wherein a rapid and smooth return to normal idle speed is accomplished when the engine has been running at a high speed condition and the throttle is rapidly closed. This is accomplished by setting the injection timing to achieve an idle speed lower than normal idle speed and when this lower than normal idle speed is reached, then the injection timing is set back to normal injection timing for the desired or normal idle speed.

10 Claims, 5 Drawing Sheets

IDLE STABILIZING SYSTEM FOR ENGINE

BACKGROUND OF THE INVENTION

This invention relates to an idle stabilizing system for an engine and more particularly to an improved control and fuel injection system for returning the engine smoothly to its idle speed when the throttle is rapidly closed from a high speed condition.

The use of fuel injection systems for maintaining good engine performance, good exhaust emission control and high fuel economy is well known. The control of the fuel injector can permit extremely good performance under a wide variety of running conditions. However, in addition to varying steady state conditions, the fuel injection and its control must provide for good operation and good control of the aforenoted characteristics during transient conditions. One of the most difficult conditions to control is the return to engine idle or low speed operation when the engine has been running at a high speed and the throttle valve is rapidly closed. During this phase of performance, there is a tendency with conventional injected units for the engine speed to reduce very slowly to idle speed with increased fuel consumption and increased HC and CO emissions.

It is, therefore, a principal object of this invention to provide an improved fuel injection system for an engine that will stabilize return to idle speed and assure a quick return to idle speed when closing the throttle from high speed operation.

It is a further object of this invention to provide an improved system and method for operating a fuel injected engine to accelerate the reduction of the engine speed to idle in a quick but smooth manner.

SUMMARY OF THE INVENTION

This invention is adapted to be embodied in a fuel injected internal combustion engine having a fuel injector for injecting fuel to the engine, a throttle valve for controlling engine speed, and means for sensing the position of the throttle valve. An injection control is provided for controlling the operation of the fuel injector and sets a lower idle speed than normal when the engine is being returned to idle speed quickly from a high speed condition and for subsequently advancing the injection timing when the idle speed falls lower than the desired final idle speed.

DETAILED DESCRIPTION OF THE PREFERRED EMBODIMENT OF THE INVENTION

Figure 1:
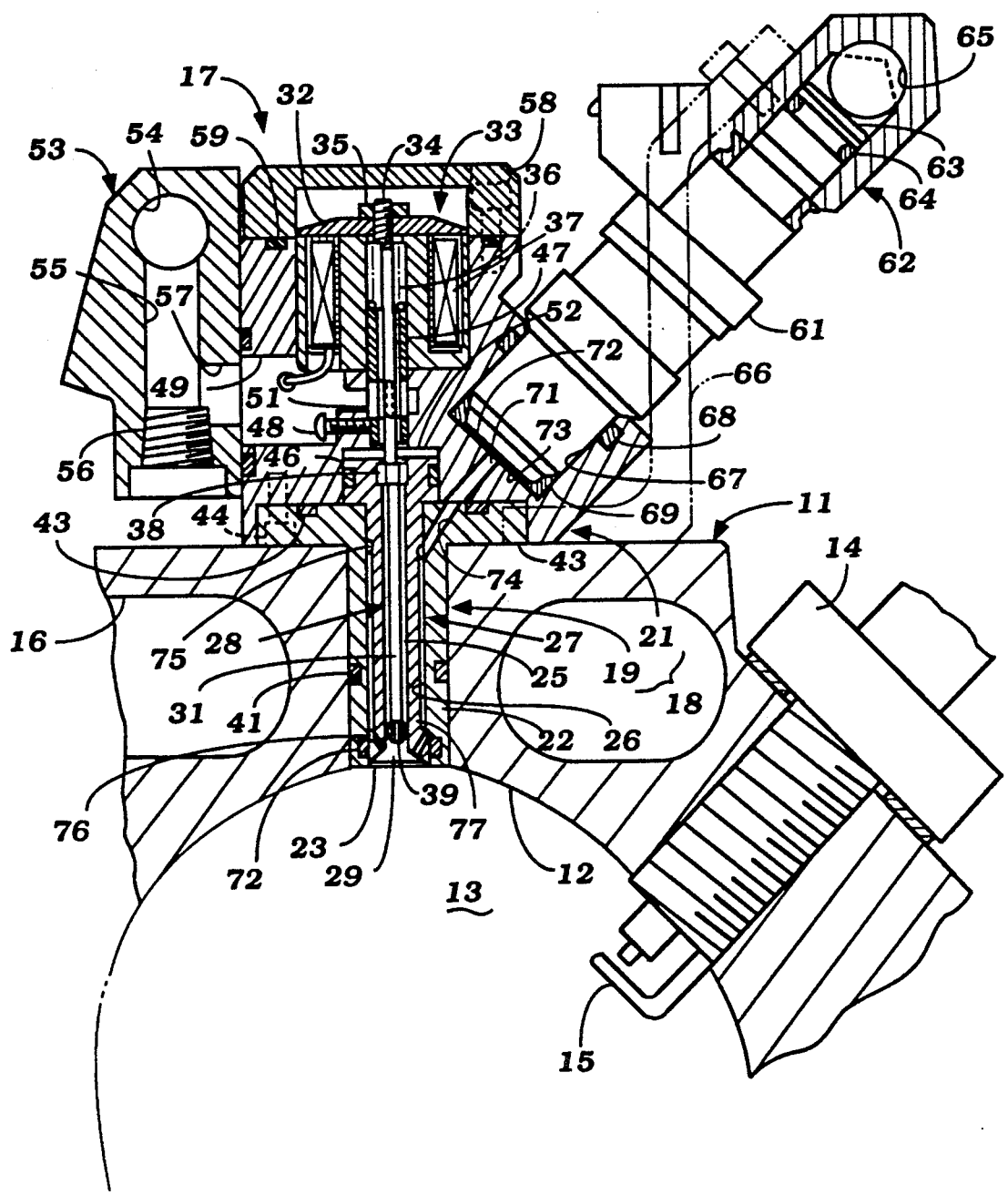
FIG. 1 is a partial cross sectional view taken through the combustion chamber of an engine having a fuel injection system constructed and operated in accordance with embodiments of the invention.

Referring first to FIG. 1, a portion of an internal combustion engine having a fuel injection system constructed and operated in accordance with the invention is partially depicted. Since the invention deals with the fuel injection system, illustration of the complete engine is not believed to be necessary in order to understand the construction and operation of the invention.

The engine depicted is of the two cycle crankcase compression type. Although the invention may be employed in conjunction with four cycle engines, it has particular utility in conjunction with two cycle engines due to the aforenoted difficulties in returning the engine to idle quickly from high speed operation.

The engine includes a cylinder head 11 which has a recess 12 which defines partially a combustion chamber 13. The combustion chamber 13 is defined by the cylinder head recess 12, the head of the piston and the cylinder bore (not shown). A spark plug 14 is threaded into the cylinder head 11 and has its gap 15 disposed appropriately in the combustion chamber 13. A cooling jacket 16 is formed in the cylinder head 11 and coolant is circulated through this cooling jacket in a known manner for engine cooling.

A fuel injector, indicated generally by the reference numeral 17, is mounted within a bore 18 formed in the cylinder head 11. In the illustrated embodiment, the injector 17 is a fuel/air injector. It is to be understood, however, that the invention may be employed with other types of fuel injectors than air/fuel injectors. For example, the invention may be utilized with injectors that inject only fuel, but the invention has particular utility in conjunction with air/fuel injectors.

The injector 17 includes a housing assembly, indicated generally by the reference numeral 18, which is comprised of a lower housing piece 19 and an upper housing piece 21. The lower housing piece 19 has a cylindrical portion 22 that is received within a suitable bore formed in the cylinder head 11 and terminates at a nozzle portion 23. The nozzle portion 23 is formed by an insert, indicated generally by the reference numeral 24, which has a cylindrical portion 25 that is disposed radially inwardly of a bore 26 formed in the cylindrical portion 22 of the lower housing portion piece 19. This forms a chamber 27 to which fuel is delivered, in a manner to be described. The nozzle opening 23 is formed by an enlarged diameter portion of the insert 24.

An injection valve, indicated generally by the reference numeral 28, has a head portion 29 that cooperates with the nozzle seat 23 so as to open and close it. The injection valve 28 has a reduced diameter portion 31 that extends through a bore in the insert piece 24 and which is connected at its upper end to an armature plate 32 of a solenoid assembly, indicated generally by the reference numeral 33. The upper end of the valve stem 31 is threaded as at 34 so as to receive a nut 35 to provide an adjustable connection to the armature plate 32.

A coil compression spring 36 acts against the armature plate 32 and urges the injection valve 28 to its normal closed position as shown in the drawing. A solenoid winding 37 encircles the upper end of the valve stem 31 and when energized will attract the armature plate 32 downwardly to compress the spring 36 and open the injection valve 28.

The valve stem 31 is provided with upper and lower extension lugs 38 and 39 that slidably engage the bore in the insert piece 24 so as to support the valve 28 for its reciprocal movement without interfering with the air flow therepast.

The cylindrical portion 22 of the housing piece 19 is formed with one or more annular grooves in which an O ring seal 41 is provided for sealing with the cylinder head 11. In a like manner, its internal surface is formed with an annular groove so as to receive an O ring seal 42 which seals with the enlarged end of the insert 24.

The housing piece 19 has an enlarged flange 43 formed at its upper end which is received within a counterbore formed in the lower face of the housing piece 21. Socket headed screws 44 affixed the housing pieces 19 and 21 to each other and an O ring seal 45 provides a seal between these pieces. The insert piece 22 has an enlarged headed portion 46 that is received within a bore formed in the housing piece 21 at the base of the counterbore which receives the flange 43 of the housing piece 19. Above this bore, the housing piece 21 is provided with a further bore that receives a sleeve 47 that is threaded to the core of the solenoid winding 37 and against which the coil compression spring 36 bears. This sleeve 47 provides a combined mounting function for the winding 37 and preload adjustment for the spring 36. The sleeve 47 is held in position by means of a lock screw 48 which is threaded through the housing piece 21 and which is accessible through an opening 49 formed in the side thereof. The opening 49 also admits air, in a manner to be described, which can flow through a slotted opening 51 in the sleeve 47 so as to be received in a gap 52 formed around the valve stem 31 and the interior of the insert piece 24.

The air is delivered to the opening 49 from an air manifold, indicated generally by the reference numeral 53, and which is affixed to the injector body. The air manifold 53 has a transversely extending passage 54, one end of which is connected to a regulated source of air pressure (not shown). The bore 54 is intersected by a crossbore 55, the outer end of which is closed by a plug 56. The manifold 53 is further provided with intersecting passages 57 which communicate with the opening 49 in the housing piece 21 so as to permit air under pressure to enter the aforenoted chamber 52.

Air leakage from around the solenoid 33 is precluded by means of a cap 58 that is affixed to the upper end of the housing piece 21 and which engages an O ring seal 59.

A fuel injector 61 is provided for the injector 17. The fuel injector 61 may be of any known type. Fuel is delivered to the fuel injector 61 by a fuel manifold 62 that is affixed to the tip 63 of the fuel injector 62 and which is sealed thereto by O ring seals 64. A manifold line 65 which communicates with a regulated pressure fuel source (not shown) delivers the fuel to the fuel injector 61. The fuel manifold 62 is mounted on a mounting bracket that is shown in phantom and which is identified by the reference numeral 66.

For ease of location, the housing piece 21 is formed with a bore 67 that is disposed at approximately a 45° angle to the axis of the injector valve 28. The bore 67 receives the nozzle portion of the injector 61. O ring seals 68 and 69 provide a sealing function around these nozzle portions so that the fuel which issues from the injector 61 will be directed toward a passage 71 bored into the housing piece 21. The passage extends from the bore 67 and specifically from a shoulder 72 formed at the base of this bore 67. The fuel injector nozzle end portion 73 is spaced slightly from the shoulder 72 so as to provide a chamber through which the fuel will be injected. By using this close spacing, no significant dead space exits between the injector nozzle and the passage 71. Dead space will be eliminated and better fuel injection control can be obtained.

The housing piece passage 71 is intersected by corresponding passage 74 formed in the housing piece 21. These passages terminate in an annular recess 75 formed in the periphery of the insert 24 so as to communicate the fuel with the chamber 27. At the lower end of the chamber 27, there is provided another annular relief 76 that is intersected by a plurality of ports 77 that extend through the lower end of the enlargement of the insert piece 24 at the valve seat 23. Hence, when the valve head 29 moves to its open position, both fuel and air will be valved into the combustion chambers 13.

It is to be understood that the amount of fuel injected can be varied in a wide variety of manners and the operation of the fuel injector 61 may be initiated either before the valve 28 is opened or after. Any such control strategies are within the spirit and scope of the invention. Also, the air pressure delivered to the port 54 can also be varied as desired so as to change the fuel/air injection characteristics. Again, this particular part of the strategy is not critical to the invention and the invention may be utilized in conjunction with any wide variety of strategies of varying air pressure and/or the timing and duration of operation of the injector 17.

Basically, the way the injector 17 operates is that air under pressure is always supplied by the manifold 53 and fuel is injected at a desired timing by the injector 61 into the chamber 27. The fuel and air will then be discharged into the combustion chamber 13 when the solenoid 33 and specifically its winding 37 is energized and the injection valve 28 is opened. As used in the specification and claims hereinafter, the term "initiation of injection" will be referred to as the time when the injection valve 28 is opened. This assumes that fuel will be supplied to the combustion chamber 13 at that time. This fuel may or may not have been precharged into the chamber 27 depending upon the specific control strategy. It may be that the fuel is supplied by the injector 61 simultaneously with opening of the injection valve 28.

Figure 2:
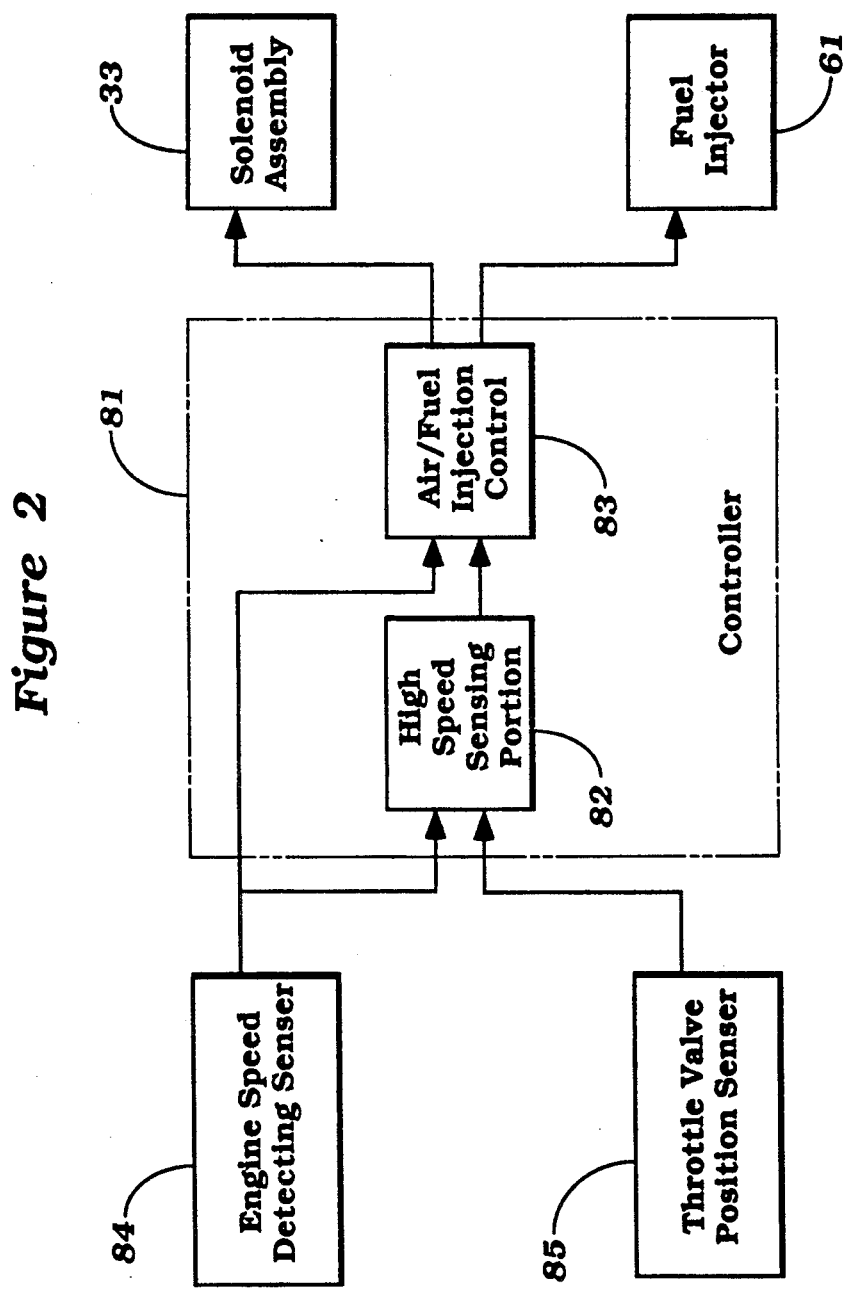
FIG. 2 is a schematic view showing the components of the injection control system.

The basic control for the system is shown schematically in FIG. 2 and will now be described by reference to that Figure. The controller for the system is indicated generally by the reference numeral 81. This controller controls both the solenoid 33 and the fuel injector 61 as shown schematically in this figure. The controller 81 is divided into a high speed sensing portion 82 and an air/fuel injection control 83.

Figure 4:
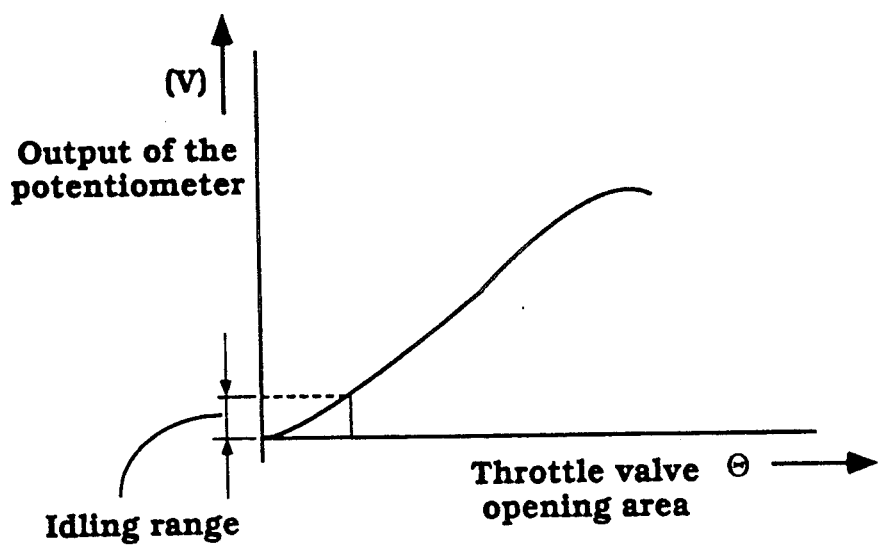
FIG. 4 is a graphic view showing the relationship of throttle opening to the output of a throttle position sensor in voltage with the idling range being shown.

There are provided a plurality of sensors for controlling the fuel injection. The sensors may include, for example, an engine speed detecting sensor 84 and a throttle valve position sensor 85, which may be a potentiometer that outputs a voltage signal V which depends upon throttle opening as shown by the curve of FIG. 4. It will be seen that this curve is linear during a substantial portion of the operation, particularly outside of the idle range.

As has been previously noted, all engines tend to have a period of instability when they are returned to idle from wide open throttle or high speed conditions. That is, the engine does not return as rapidly as desired to the idle speed and hence, poor fuel economy and uneven running may occur under these rapid deceleration conditions. In accordance with the invention, the timing of the initiation of fuel injection is set to a retarded state under this condition so as to call for a lower idle speed than the desired idle speed. When this lower idle speed is reached, then the timing of the injection is advanced up to that of the normal idle speed so as to return the engine to the normal idle speed. This has been found to produce more rapid deceleration of the engine and a more rapid and smoother return to normal idle speed.

Figure 3:
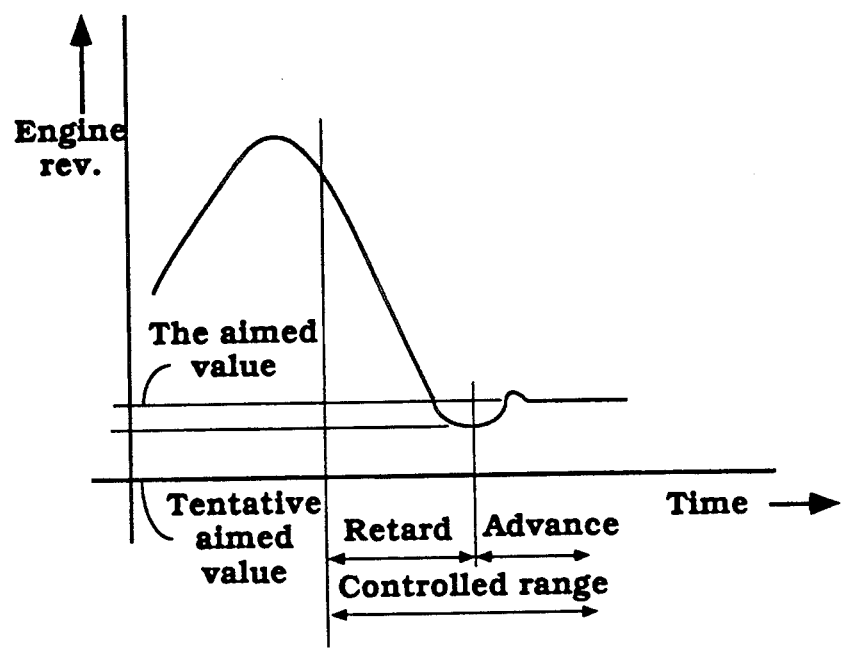
FIG. 3 is a graphic view showing the relationship of engine speed to time during the condition of return to idle after high speed operation.

FIG. 3 is a graphic view showing the range of engine speed versus time under a condition when the engine has been running at a high rate of speed then the operator rapidly closes the throttle valve. It will be noted from this curve that the speed increases to a maximum and then, as the operator releases the accelerator pedal, the speed will fall. At a point indicated by the vertical line beginning the controlled range, when the engine speed has fallen to a certain value, then the controller 82 senses the need for rapid deceleration to idle speed and sends a signal to the solenoid 33 which will initiate a retardation in the beginning of fuel injection so as to cause the speed to reduce rapidly below the normal idle speed to a tentative aimed idle speed, which has a lower speed. When this point is reached, then the injection timing is advanced toward that which dictates the normal idle speed and the engine speed will return to normal idle speed in a smooth and rapid manner.

Figure 5:
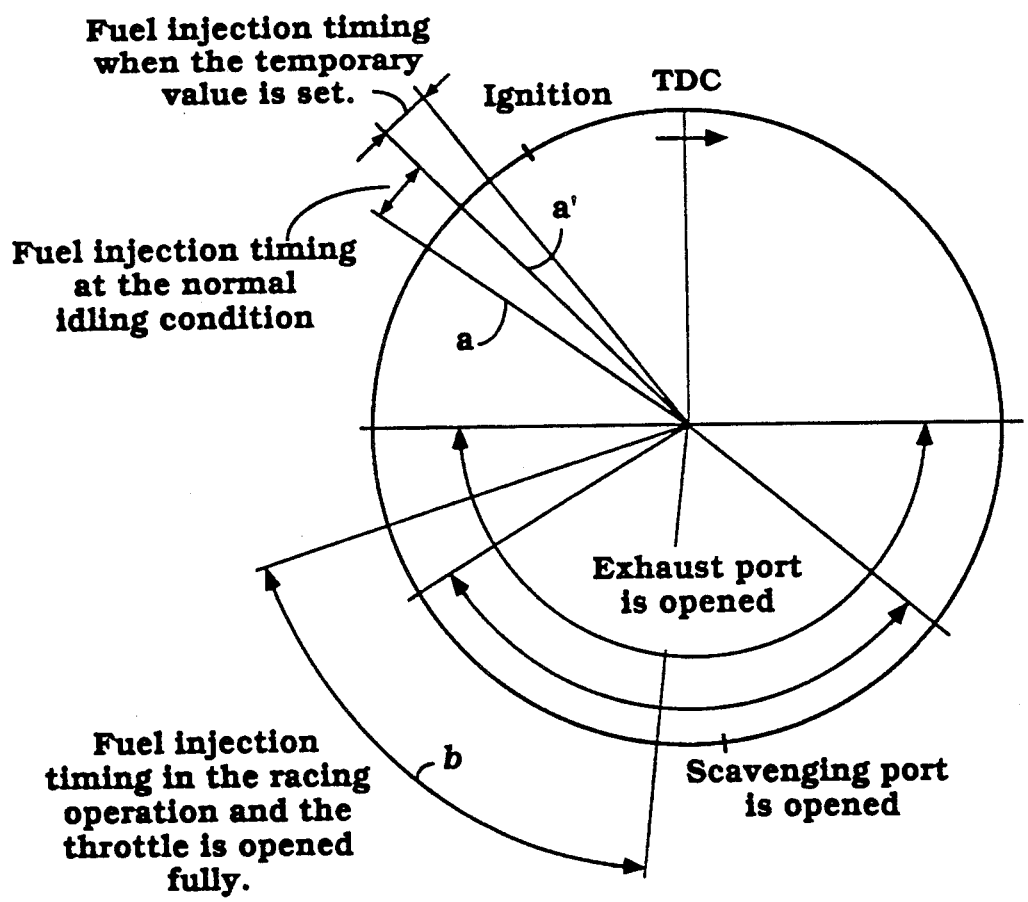
FIG. 5 is a timing diagram showing the timing of injection in order to return the engine rapidly to idle after high speed operation.

FIG. 5 is a timing diagram showing the times of opening of the scavenge port, exhaust port and firing of the spark plug. There is a first point a which is the normal timing of injection at idle. The retarded injection timing is shown by a' and is accomplished to achieve the aforenoted effect. The range b indicates the injection timing when operating at high load, high speed, for example, full throttle operation.

Figure 6:
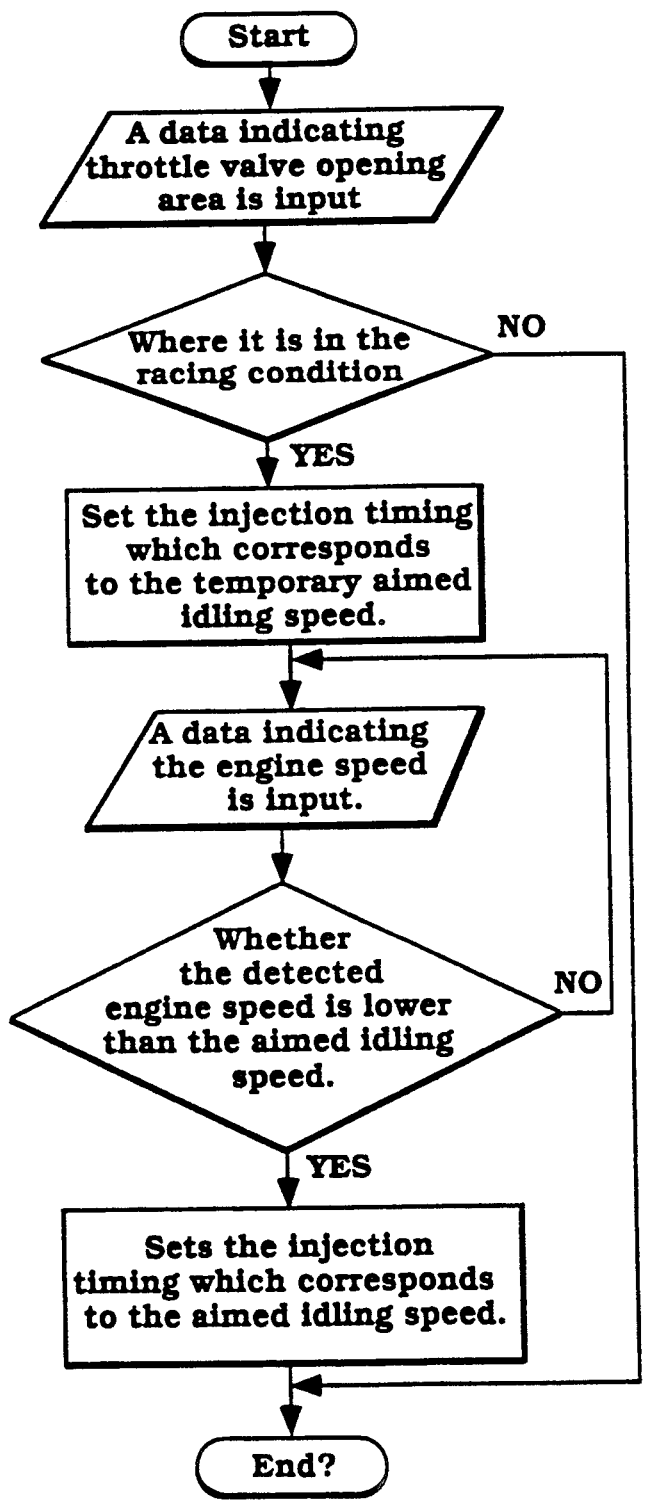
FIG. 6 is a block diagram showing the control routine for returning the engine rapidly to idle from high speed.

The control routine by which this rapid return to idle speed is achieved is shown in FIG. 6. Referring specifically to this figure, after the program starts, it moves to the step S1 wherein the rapid deceleration from high speed portion 82 of the controller 81 determines if there is a condition when the throttle valve has been opened at a high speed condition and then is closed rapidly. This determination is made at the step S2 from data measured at the step S1 and if the throttle valve is not being rapidly closed from a high speed condition, the program exits and ends.

If, on the other hand, there is sensed a condition when the engine has been operating at high speed and the throttle valve is rapidly closed, the program moves to the step S3 wherein the injection timing is retarded below normal idle speed timing to set a lower than normal idle speed, as indicated by the line on FIG. 3.

The program then moves to the step S4 so as to determine the actual engine speed which then is compared at the step S5 with the desired lower than normal idle speed. If the step S5 determines that the idle speed is still higher than the aimed lowered speed, the program moves back to the step 4 and continues to repeat.

When it is determined at the step S5 that the idle speed has reached the desired lower than normal idle speed, the program then moves to the step S6 and sets the injection timing to achieve the normal idle speed. The program then ends.

It should be readily apparent from the foregoing description that the described system is highly effective in insuring rapid return of the engine to idle speed and better fuel economy when the throttle is rapidly closed from a high speed condition. Of course, the preceding description is that of a preferred embodiment of the invention. Various changes and modifications may be made without departing from the spirit and scope of the invention, as defined by the appended claims.

I claim:

1. A fuel injection system for an internal combustion engine comprising a fuel injector for injecting fuel to the engine, control means for controlling the operation of said fuel injector to determine the speed at which said engine runs, means for sensing engine speed, means for sensing throttle opening position, means for determining when the engine has been operating at a high speed condition and the throttle has been rapidly closed, and means for operating said control means to cause said fuel injector to have said engine operate at a speed lower than normal idle speed in response to a rapid closure of the throttle valve from a high speed condition.

2. A fuel injection system as set forth in claim 1 further including means for operating the control means to cause the fuel injector to have the engine return to normal idle speed when the lower than normal speed has been reached.

3. A fuel injection system as set forth in claim 1 wherein the control means varies injection timing of the fuel injector and injection timing is retarded to effect the lower than normal idle speed.

4. A fuel injection system as set forth in claim 2 wherein the control means varies injection timing of the fuel injector and injection timing is advanced when the engine idle speed is below the normal idle speed for returning the engine to a normal idle speed.

5. A fuel injection system as set forth in claim 4 wherein the control means causes injection timing to be retarded to set the lower than normal idle speed.

6. A method of operating a fuel injection system for an internal combustion engine comprising a fuel injector for injecting fuel to the engine, comprising the steps of sensing engine speed, sensing throttle opening position, sensing when the engine has been operating at a high speed condition and the throttle has been rapidly closed, and controlling the fuel injection to effect an engine speed lower than normal idle speed under the sensed condition of a rapid closure of the throttle valve from a high speed condition.

7. A method as set forth in claim 6 further including the step of controlling the fuel injection to return to normal idle speed after the lower than normal speed has been reached.

8. A method as set forth in claim 6 wherein injection timing is retarded to set the lower than normal idle speed.

9. A method as set forth in claim 7 wherein injection timing is advanced when the engine idle speed is below the normal idle speed for returning the engine to normal idle speed.

10. A method as set forth in claim 9 wherein the injection timing is retarded to set the lower than normal idle speed.

* * * * *